(12) United States Patent
Wu

(10) Patent No.: US 8,797,647 B2
(45) Date of Patent: Aug. 5, 2014

(54) DOUBLE-VISION DISPLAY, DOUBLE-VISION COLOR FILM STRUCTURE AND MANUFACTURING METHOD THEREOF

(75) Inventor: Yanbing Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 133 days.

(21) Appl. No.: 13/380,126

(22) PCT Filed: Apr. 28, 2011

(86) PCT No.: PCT/CN2011/073476
§ 371 (c)(1),
(2), (4) Date: Dec. 22, 2011

(87) PCT Pub. No.: WO2011/134414
PCT Pub. Date: Mar. 11, 2011

(65) Prior Publication Data
US 2012/0099215 A1    Apr. 26, 2012

(30) Foreign Application Priority Data
Apr. 30, 2010    (CN) .......................... 2010 1 0167823

(51) Int. Cl.
*G02B 27/22*    (2006.01)
*G02F 1/1335*    (2006.01)

(52) U.S. Cl.
CPC .......... *G02B 27/225* (2013.01); *G02B 27/2214* (2013.01); *G02F 1/1335* (2013.01)
USPC ................................ 359/478; 345/24; 345/25

(58) Field of Classification Search
CPC .. G02B 27/22; G02B 27/2214; G02B 22/225; G02F 1/1335
USPC ......... 359/891, 462, 463, 464, 465, 478, 479; 349/106, 15, 122; 445/25, 24
See application file for complete search history.

(56) References Cited

U.S. PATENT DOCUMENTS

| | | | | |
|---|---|---|---|---|
| 5,039,204 | A | * | 8/1991 | Choi ............................ 349/106 |
| 2005/0183789 | A1 | * | 8/2005 | Hong ............................... 141/8 |
| 2007/0063941 | A1 | | 3/2007 | Tanaka |

(Continued)

FOREIGN PATENT DOCUMENTS

| CN | 1617014 A | 5/2005 |
|---|---|---|
| CN | 101105579 A | 1/2008 |

(Continued)

OTHER PUBLICATIONS

International Preliminary Report on Patentability; mailed Nov. 15, 2012; Appln. No. PCT/CN2011/073476.

(Continued)

*Primary Examiner* — David N Spector
(74) *Attorney, Agent, or Firm* — Ladas & Parry LLP

(57) ABSTRACT

A double-vision color filter structure comprises a glass substrate, a slit grating, a transparent thin layer and a pattern of pixels, wherein the slit grating is formed on the glass substrate, the transparent thin layer is arranged on the surface of the slit grating on the glass substrate to form a cell structure with the glass substrate, and the pattern of pixels are formed on the transparent thin layer in the cell structure and comprises odd sub-pixel columns and even sub-pixel columns.

12 Claims, 2 Drawing Sheets

(56) References Cited

U.S. PATENT DOCUMENTS

| | | | |
|---|---|---|---|
| 2007/0063943 A1 | 3/2007 | Tanaka et al. | |
| 2007/0064102 A1 | 3/2007 | Tanaka | |
| 2007/0215912 A1* | 9/2007 | Kido et al. | 257/257 |
| 2009/0040426 A1 | 2/2009 | Mather et al. | |
| 2009/0066864 A1 | 3/2009 | Koyama et al. | |
| 2009/0103024 A1* | 4/2009 | Kuo et al. | 349/110 |
| 2009/0243961 A1 | 10/2009 | Momose | |
| 2009/0309958 A1 | 12/2009 | Hamagishi et al. | |
| 2010/0182686 A1* | 7/2010 | Fukushima et al. | 359/463 |

FOREIGN PATENT DOCUMENTS

| | | |
|---|---|---|
| CN | 101162311 A | 4/2008 |
| CN | 101256245 A | 9/2008 |
| GB | 2 405 542 A | 3/2005 |
| JP | 2007-086381 A | 4/2007 |
| JP | 2009-223100 A | 10/2009 |
| KR | 20050022955 A | 3/2005 |
| KR | 20080112623 A | 12/2008 |
| TW | 200912394 A | 3/2009 |
| WO | WO 2008029891 A1 * | 3/2008 |

OTHER PUBLICATIONS

Chinese First Office Action; dated Aug. 3, 2013; Appln. No. 2010101678235.

International Search Report: mailed Aug. 11, 2011; PCT/CN2011/073476.

Third Chinese Office Action dated Sep. 22, 2013; Appln. 201010167823.5.

KIPO Office Action dated Jul. 30, 2013; Appln. No. 10-2011-7031049.

Extended European Search Report dated Dec. 6, 2013; PCT/CN2011073476.

* cited by examiner

US 8,797,647 B2

DOUBLE-VISION DISPLAY, DOUBLE-VISION COLOR FILM STRUCTURE AND MANUFACTURING METHOD THEREOF

TECHNICAL FIELD

Embodiments of the present invention relate to a double-vision display, a double-vision color filter structure and a method of making the same.

BACKGROUND

The double-vision display technology is one in which a slit grating is attached in front of a display unit such that viewers from different angles can see different images on the same display. FIG. 1 is a schematic view of the display principals of an existing double-vision display technology, and FIG. 2 is a schematic view of an existing double-vision display structure. As shown in the figures, the double-vision display structure 100 comprises a display unit 70 and a slit grating 80 provided in front of the display unit, the distance between which is h, and this distance h is referred to as a predetermined height. Odd sub-pixel columns 72-1 on the display unit 70 display one image, and even sub-pixel columns 72-2 display another image. Each opening of the slit grating 80 is arranged between adjacent odd and even sub-pixel columns. As long as the predetermined height h is appropriate, a viewer can see the image displayed by even sub-pixel columns on the left side of the double-vision display, which forms a left vision area, while can see the image displayed by odd sub-pixel columns on the right side of the double-vision display, which forms a right vision area; and the intermediate part can be seen on both sides, which forms a crosstalk area.

There are at least the following problems in the existing technology. The width of a sub-pixel on the existing display unit 70 is typically about 50 microns. In order to achieve big enough left and right vision areas while reduce the crosstalk area as much as possible, the predetermined height is generally set to about 100 microns. When the display unit is a liquid crystal display, the liquid crystal display typically comprises red, green and blue (RGB) sub-pixels 72 (72-1, 72-2) and a color filter glass 71. In this case, the predetermined height h described above refers to the perpendicular distance between the upper surface of RGB sub-pixels 72 and the upper edge of the slit grating 80. However, in a practical production process, it is very difficult to produce a color filter glass of about 100 microns. Although it can be realized by reducing the thickness of a glass, this method is not suitable for automatic mass production.

SUMMARY

According to one embodiment of the present invention, there is provided a production method for a double-vision color filter structure, which comprises: forming a slit grating on a glass substrate; providing a transparent thin layer on the surface of the glass substrate formed with the slit grating to form a cell structure; and forming a pattern of pixels on the transparent thin layer in the cell structure, the pattern of pixels comprising odd sub-pixel columns and even sub-pixel columns.

According to another embodiment of the present invention, there is provided a double-vision color filter structure which comprises a glass substrate, a slit grating, a transparent thin layer and a pattern of pixels, wherein the slit grating is formed on the glass substrate, the transparent thin layer is arranged on the surface of the slit grating on the glass substrate to form a cell structure with the glass substrate, and the pattern of the pattern of pixels are formed on the transparent thin layer in the cell structure and comprises odd sub-pixel columns and even sub-pixel columns.

According to a further embodiment of the present invention, there is provided a double-vision display which comprises: a display unit and a double-vision color filter structure described above, wherein the double-vision color filter structure is provided above the display unit.

BRIEF DESCRIPTION OF THE DRAWINGS

For a more clear illustration of the embodiments of the present invention or the existing technical solutions, the accompany drawings which are necessary for the description of the embodiments or the prior art will be briefly explained below. Obviously, the accompany drawings described below are merely a part of the embodiments of the present invention. For those of ordinary skill in the art, other accompany drawings can be obtained depending on these accompany drawings without inventive work.

DETAILED DESCRIPTION

Next, in order to make the purposes, technical solutions and advantages of embodiments of the present invention more clear, the technical solution of the embodiments of the present invention will be described clearly and fully with reference to the accompany drawings. Obviously, the embodiments described are just some embodiments of the present invention, and not all the embodiments. Based on the embodiments in the present invention, other embodiments obtained by those of ordinary skill in the art without inventive work all belong within the technical scope of the present invention.

Figure 1:
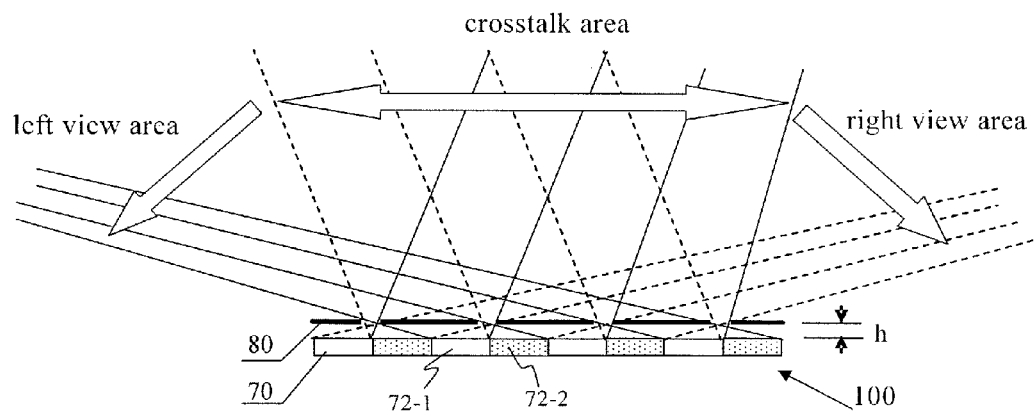
FIG. 1 is a schematic view of display principals of an existing double-vision display technology.
Figure 2:
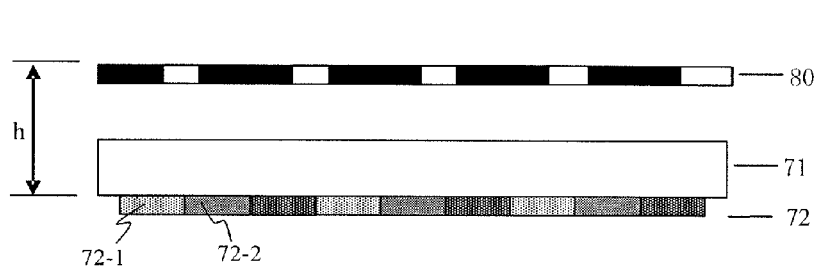
FIG. 2 is a schematic view of an existing double-vision display structure.
Figure 3:
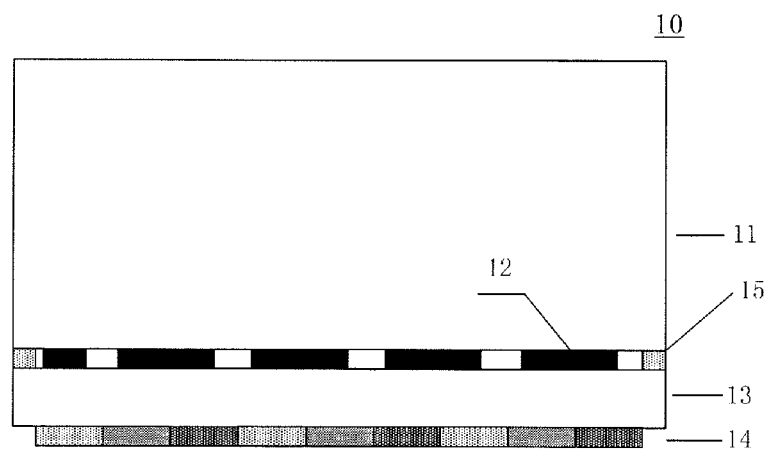
FIG. 3 is a cross-sectional view of embodiment 1 of the double-vision color filter structure according to embodiments of the present invention.

FIG. 3 is a cross-sectional view of a first embodiment of the double-vision color filter structure according to the present invention. As shown in FIG. 3, the double-vision color filter structure 10 in this embodiment comprises a glass substrate 11, a slit grating 12, a transparent thin layer 13, and RGB pixels 14. The slit grating 12 is formed on the glass substrate 11. The transparent thin layer 13 is provided on the surface of the glass substrate 11 formed with the slit grating 12 to form a cell structure with the glass substrate 11. The pattern of the red, green, and blue (R, G, B) pixels 14 comprises RGB color filters, is formed on the transparent thin layer 13 in the cell structure, and comprises odd sub-pixel columns 14-1 and even sub-pixel columns 14-2. Each opening of the slit grating 12 is arranged between adjacent odd sub-pixel columns and even sub-pixel columns so as to achieve a double-vision display functionality. The pixels 14 are not limited to RGB pixels, but may also be other coloring schemes, such as magenta, cyan, yellow, and black (CMYK).

The transparent thin layer 13 may be a super-thin glass or plastic thin film. The peripheries of the surface of the glass substrate 11 formed with the slit grating 12 are provided with sealant 15 by dropping, by which the glass substrate 11 and the transparent thin layer 13 are fixed together to form the cell structure. In addition, the transparent thin layer 13 may also be formed as a layer of inorganic material, such as a layer of silicon nitride, on the surface of the glass substrate 11 formed with the slit grating 12.

The glass substrate 11 has a thickness capable of being processed in a production line. The glass substrate 11 may be a glass substrate used in the manufacturing process of a color filter substrate of a liquid crystal display. Grating strips on the slit grating 12 are for example made of the material used to produce a black matrix (BM).

The double-vision color filter structure 10 according to this embodiment can implemented with existing materials and can be produced with existing apparatuses of LCD production factories, and therefore is compatible with the LCD manufacturing process used currently and suitable for automatic mass production.

Figure 4:
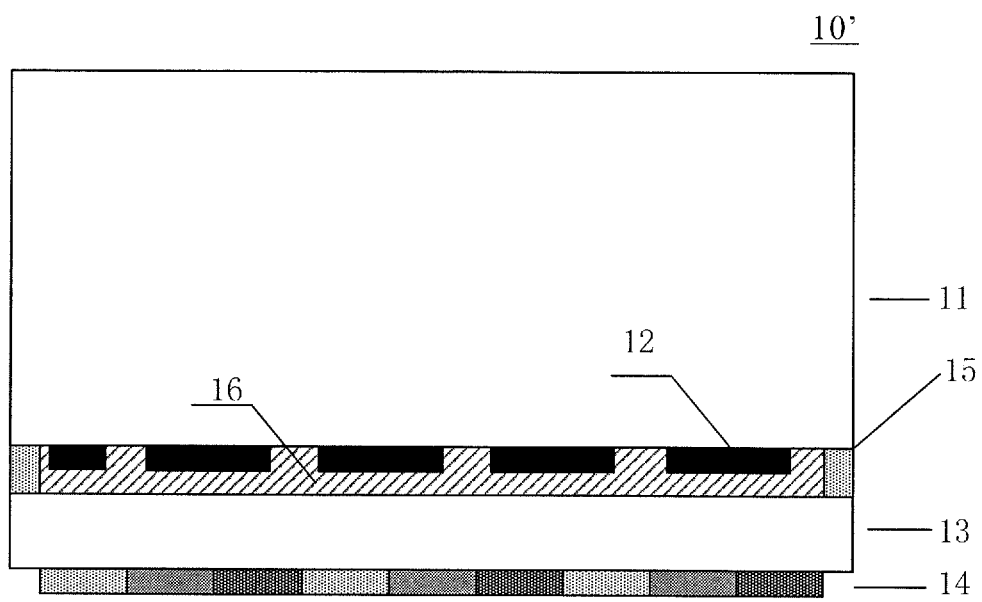
FIG. 4 is a cross-sectional view of embodiment 2 of the double-vision color filter structure according to embodiments of the present invention.
Figure 5:
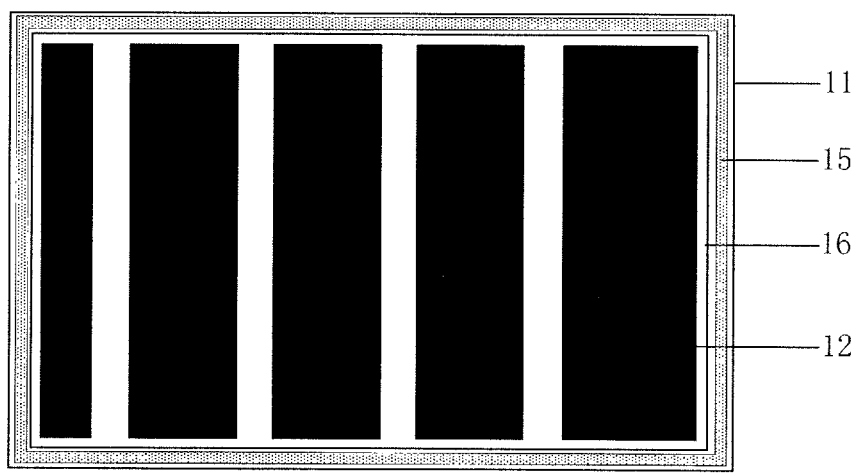
FIG. 5 is a plan view of the double-vision color filter structure shown in FIG. 4.

FIG. 4 is a cross-sectional view of a second embodiment of the double-vision color filter structure according to the present invention, and FIG. 5 is a plan view of the double-vision color filter structure shown in FIG. 4. As shown in FIGS. 4 and 5, on the basis of the first embodiment, the structure of the double-vision color filter structure 10' is further formed with an planarization layer 16 between the slit grating 12 and the transparent thin layer 13, so that the slit grating 12 does not directly contact with the transparent thin layer 13 after the cell forming assembly, avoiding the impact of an air gap therebetween on the viewing effect. The planarization layer can be formed of an organic or inorganic insulating material, such as polyethylene naphthalate (PEN), polymethyl methacrylate (PMMA), polyimides (PI), or the like.

Each of the embodiments of the present invention described above further comprises a double-vision display formed by attaching the double-vision color filter structure on the screen of the display unit. The examples of the display unit comprise a liquid crystal display panel (LCD), a plasma display panel (PDP), an organic light-emitting diode display (OLED), or the like. The double-vision display can display two images at the same time, to satisfy different requirements of two viewers. Thereby, the cost to purchase a plurality of displays and the placement space can be saved. As an example, it can be applied to automobile, in which a driver can see the map of the global positioning system (GPS) from one side, whereas a passenger at the passenger seat can watch videos such as a movie. As another example, it can be applied to a house environment, in which the husband can view a soccer match from one side, whereas the wife can view a soap opera from another side, preventing a quarrel from occurring because of different interests.

There is also provided a production method of the double-vision color filter structure according to an embodiment of the present invention, which can comprise the following steps.

Step 101, forming a slit grating on a glass substrate.

The slit grating is capable of mating with the RGB pixels formed later, so as to produce a double-vision effect. The glass substrate has a thickness capable of being processed in a production line, such as a thickness of 0.5 mm. Since such a glass substrate has a relatively high thickness, it is not bent or deformed during the working process in the production line.

For example, the glass substrate can adopt a glass substrate used in the manufacturing process of a color filter substrate of a liquid crystal display, while the grating grooves can be made of the material used to produce a black matrix (BM), thus easy to form.

Step 102, providing a transparent thin layer on the surface of the glass substrate formed with the slit grating to form a cell structure.

Particularly, according to different materials of the transparent thin layer, this step can have different implementing examples as follows.

For example, when the transparent thin layer is a super-thin glass or plastic thin film, it can go as follows, first dropping sealant to the peripheries of the surface of the glass substrate formed with the slit grating; and then placing the transparent thin layer over the surface of the glass substrate dropped with the sealant in a vacuum condition; and lastly curing the sealant on the glass substrate to allow the glass substrate and the transparent thin layer to be bound and fixed together to form the cell structure.

The thickness of the transparent thin layer is about 70-200 microns, which can be determined as necessary. When a super-thin glass is adopted as the transparent thin layer, in an existing liquid crystal display (LCD) production factory, the super-thin glass is very difficult to be conveyed on the production line. However, in this step, the super-thin glass can be first laid flat on a base station of a vacuum cell-forming apparatus used to produce a LCD, and then the glass substrate is adsorbed by a top station of the vacuum cell-forming apparatus to be laid on the super-thin glass.

For another example, when the transparent thin layer is a layer of silicon nitride, the layer of silicon nitride can be formed on the surface of the glass substrate formed with the slit grating, so as to form the cell structure.

Step 103, forming a pattern of RGB pixels on the transparent thin layer of the cell structure.

This step can be conducted with a normal color filter substrate processing in an existing color filter substrate production factory. The RGB pixels comprise odd and even sub-pixel columns capable of displaying different images respectively.

The method according to this embodiment adopts existing materials and existing apparatuses of existing LCD production factories to achieve the production of the double-vision color filter structure, which is compatible with the existing apparatus and process and suitable for automatic mass production.

In addition, if the slit grating and the transparent thin layer contact directly, it is easy to leave an air layer between the grating grooves on the slit grating. Because the air layer is easy to accommodate dusts and the refractive index of the air layer is largely different from those of the transparent thin layer and the slit grating located above and below, the viewing effect would be impacted. To this end, before forming the cell structure described in the step 102, an planarization layer can also be selectively formed on the slit grating according to the displaying effect.

Particularly, when the transparent thin layer is a super-thin glass or plastic thin film, the planarization layer is formed on the slit grating before dropping sealant to the peripheries of the surface of the glass substrate formed with the slit grating, whereas when the transparent thin layer is a layer of silicon nitride, the planarization layer is formed on the slit grating before forming the layer of silicon nitride on the surface of the glass substrate formed with the slit grating.

By filling the void between two grating grooves with the planarization layer according to this embodiment, the slit grating is allowed to be flattened, and the slit grating and the transparent thin layer are allowed not to contact directly after formation of cell structure so as to avoid the impact of the air layer on the viewing effect.

Lastly, it should be noted that the embodiments above are only used to illustrate the technical solutions of the present invention, and not to limit them. Although the present invention is described in detail with reference to the above described embodiments, those with ordinary skill in the art should appreciate that the technical solutions described in each of the above embodiments can be modified, or a part of the technical features of them can be replaced equivalently, without departing form the spirit and scope of the technical solutions in the embodiments.

What is claimed is:

1. A production method for a double-vision color filter structure, comprising:
   forming a slit grating on a glass substrate;
   providing a transparent thin layer on the surface of the glass substrate formed with the slit grating to form a cell structure, wherein the transparent thin layer is super-thin glass, and a thickness of the transparent thin layer is about 70-200 microns; and
   forming a pattern of pixels on the transparent thin layer in the cell structure, the pattern of pixels comprising odd sub-pixel columns and even sub-pixel columns.

2. The method according to claim 1, wherein the transparent thin layer is a silicon nitride layer, and
   the step of providing the transparent thin layer on the surface of the glass substrate formed with the slit grating to form the cell structure comprises: forming the silicon nitride layer on the surface of the glass substrate formed with the slit grating to form the cell structure.

3. The method according to claim 2, further comprising a step of forming an planarization layer on the slit grating before forming the silicon nitride layer on the surface of the glass substrate formed with the slit grating.

4. The method according to claim 1, wherein the transparent thin layer is the super-thin glass, and the step of providing the transparent thin layer on the surface of the glass substrate formed with the slit grating to form the cell structure comprises:
   dropping sealant to the peripheries of the surface of the glass substrate formed with the slit grating;
   placing the transparent thin layer over the surface of the glass substrate dropped with the sealant under vacuum environment; and
   curing the sealant on the glass substrate to allow the glass substrate and the transparent thin layer to be bound and fixed together to form the cell structure.

5. The method according to claim 4, further comprising a step of forming an planarization layer on the slit grating before the step of dropping sealant to the peripheries of the surface of the glass substrate formed with the slit grating.

6. The method according to claim 4, wherein the step of placing the transparent thin layer over the surface of the glass substrate dropped with the sealant comprises:
   laying flatly the transparent thin layer on a base station of a vacuum cell-forming apparatus used to produce a LCD; and
   adsorbing the glass substrate by a top station of the vacuum cell-forming apparatus, to allow the surface of the glass substrate dropped with the sealant to face the transparent thin layer and then laid on the transparent thin layer.

7. A double-vision color filter structure, comprising:
   a glass substrate,
   a slit grating,
   a transparent thin layer, and
   a pattern of pixels,
   wherein the transparent thin layer is super-thin glass, a thickness of the transparent thin layer is about 70-200 microns, the slit grating is formed on the glass substrate, the transparent thin layer is arranged on the surface of the slit grating on the glass substrate to form a cell structure with the glass substrate, the pattern of the pattern of pixels are formed on the transparent thin layer in the cell structure and comprises odd sub-pixel columns and even sub-pixel columns.

8. The structure according to claim 7, wherein the transparent thin layer is the super-thin glass, the peripheries of the surface of the glass substrate formed with the slit grating are provided with sealant by dropping, by which the glass substrate and the transparent thin layer are bound and fixed together to form the cell structure.

9. The structure according to claim 7, wherein the glass substrate is a glass substrate used in a manufacturing process for a color filter substrate of a liquid crystal display, and grating grooves on the slit grating are made of a material used to produce a black matrix.

10. The structure according to claim 7, wherein a planarization layer is formed between the slit grating and the transparent thin layer.

11. A double-vision display, comprising:
    a display unit; and
    the double-vision color filter structure according to claim 7,
    wherein the double-vision color filter structure is provided above the display unit.

12. The double-vision display according to claim 11, wherein the display unit is a liquid crystal display panel, a plasma display panel, or an organic light-emitting diode display.

* * * * *